United States Patent
Hamidat et al.

(10) Patent No.: US 9,886,826 B1
(45) Date of Patent: Feb. 6, 2018

(54) AUTOMATIC BARCODE VERIFIER

(71) Applicant: Datalogic ADC, Inc., Eugene, OR (US)

(72) Inventors: Mohamed Hamidat, Fresnes (FR); WenLiang Gao, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 15/222,238

(22) Filed: Jul. 28, 2016

(51) Int. Cl.
  *G07G 1/00* (2006.01)
  *G06K 7/14* (2006.01)
  *G06F 17/30* (2006.01)

(52) U.S. Cl.
  CPC ....... *G07G 1/0045* (2013.01); *G06F 17/3028* (2013.01); *G06K 7/1413* (2013.01); *G06K 7/1447* (2013.01)

(58) Field of Classification Search
  None
  See application file for complete search history.

(56) References Cited

U.S. PATENT DOCUMENTS

| | | | | |
|---|---|---|---|---|
| 6,135,354 A | * | 10/2000 | Kubon | G06K 7/1478 235/462.11 |
| 2015/0205984 A1 | * | 7/2015 | Jiang | G06K 19/08 235/437 |

OTHER PUBLICATIONS

Bar Code Verification for Linear Symbologies, Revised May 2007, GS1 US, Lawrenceville, New Jersey, USA, 43 pages.
1D Barcode Verification Process Implementation Guideline, Release 24.1, Ratified Jul. 2015, GS1 AISBL, 44 pages. Accessed Jul. 14, 2016 http://www.gs1.org/docs/barcodes/1D_Barcode_verification_implementation_guideline.pdf.
Retail Store Automation Systems Management and the Role of the Bar Code Scanner, Revised Jan. 1, 2012, Datalogic ADC, Inc., 8 pages.
EAN-8 Symbology, Copyright 2006, BarCodeIsland.com, Inc., 3 pages. Accessed Jul. 14, 2016 http://www.barcodeisland.com/ean8.phtml.
GS1 General Specifications, Release 16.0, Ratified Jan. 2016, GS1 AISBL, 438 pages. Accessed Jul. 14, 2016 http://www.gs1.org/docs/barcodes/GS1_General_Specifications.pdf.
Magellan 8500St Bi-Optic Scanner, Datalogic ADC, Inc., 1 page. Accessed Jul. 14, 2016 http://www.datalogic.com/eng/products/automatic-data-capture/in-counter/on-counter-scanners/scales/magellan-8500xt-pd-155.html.

\* cited by examiner

*Primary Examiner* — Kristy A Haupt
(74) *Attorney, Agent, or Firm* — Shook, Hardy & Bacon L.L.P.

(57) ABSTRACT

A scanner is configured to verify barcodes as described below. The scanner has a processor and memories for reading a barcode, capturing images of the product having the barcode, and generating notifications based on attributes of the barcode attached to the product. The processor measures barcode attributes specified by international barcode standards for each barcode extracted from the product images. A grade is then assigned to each extracted barcode based on the barcode attributes and the corresponding measurements. If necessary, notifications are generated based on the assigned grade and are then transmitted to the retailer to correct the deficiencies with the barcode or the product.

20 Claims, 7 Drawing Sheets

AUTOMATIC BARCODE VERIFIER

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Conventionally, retail products include barcodes, which are optical machine-readable representations of data relating to the product to which it is attached. Normally, during checkout, a cashier or customer equipped with a scanner or a checkout robot with a scanner (e.g., automated checkout, self-checkout, etc.) reads the barcode. Once the barcode is scanned, a computer connected to the scanner identifies the product and returns a corresponding sale price for the item. In turn, the robot or cashier receives monetary funds from the customer that equal or exceed the sale price to close out the sale of the product.

Retailers are automating their checkout processes to increase productivity and throughput in their storefronts. Unfortunately, some retailers lose throughput and productivity when products have barcodes that fail to follow international standards. These international standards specify where to place the barcode, how to print the barcode, or other formatting criteria. The standards may consist of Global Standard One (GS1), which specifies global trade identifier formats, and other international standards for barcodes.

At the checkout counter or the point of sale, the average scanning rate for a specific robot or cashier may be significantly impacted by the quality of the barcode. In other instances, when the barcode is poorly printed on a product, the cashier may have to manually identify the product by inspecting it, confirming its inventory number in the product database, and confirming the sale price. Additionally, when the barcode is inconsistent with current industry standards, the scanner may not be able to decode the information stored in the barcode. Out-of-specification barcodes may cause loss of time, which may be estimated to be several seconds, especially when the barcode cannot be read by one of several automatic readers (e.g., fixed scanners or hand-held scanner used for larger items).

SUMMARY

The embodiments of the invention overcoming these and other problems in the industry relate in one regard to devices for, among other things, scanning barcodes and generating notifications when the barcodes are misplaced, inconsistent with industry standards, misprinted, or have any other configurable error.

In at least one embodiment, a verification server automatically surveys the quality for barcodes printed on a product (e.g., items sold in retail stores or wholesale locations). The results of the verification survey, in turn, are provided to a store manager or designated individual to identify problematic barcodes. With the problematic barcodes and products flagged, the store manager may design and implement changes (e.g., reprinting barcodes, restocking products from the same manufacturer, or restocking products from a different manufacturer) to improve productivity and throughput at checkout or to notify the supplier to modify the barcode (e.g., printing or placement) so that it adheres to international standards.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the invention are described in detail below with reference to the attached figures, which are incorporated by reference herein and wherein.

DETAILED DESCRIPTION

Embodiments of the invention provide a verification system for barcodes that are included in images associated with scanned products. The verification system generates notifications that may indicate whether the barcodes are misprinted, misaligned, or out of specification. In certain embodiments, the verification system may be a virtual component that resides in a scanner or point of sale terminal or can be installed on a designated computer or server.

Inventory management at most large-scale retailers or organizations with thousands of product references can be very difficult. For instance, it would be a significant economic and resource challenge to efficiently monitor and correct barcodes on a set of references corresponding to the products available at these organizations. The large number of references (e.g., 50K+) and the rapid turnover (the shelves must be replenished every day or week) of products require an efficiently designed autonomous solution.

Although the issue of identifying problematic barcodes has been well-known for decades, attempts to understand the root cause of the reading issues at the scanners or barcode readers have been elusive. The reason for this, in-part, is that retailers have predominantly sought solutions that involve humans as costly and imperfect barcode reviewers. Human inspection of barcodes and products may be cost prohibitive. That is, the cost to implement corrective measures has historically been too costly for retailers. One possible corrective measure implemented at some retailers, is as follows: Select and train a team of barcode reviewers. Deploy the team into the retail store and have each team member manually record product and barcode data; the team members also are responsible for taking pictures for a concerned product. Once the data is collected, have the team manually inspect the image and collected data for inconsistencies. This process would have to be repeatedly continuously as new products replace current products for the universe of concerned products. Unfortunately, using human resources to catalog and verify information about barcodes and products takes time and money and still does not guarantee accurate results. This is why few retailers have deployed teams to find problematic barcodes, even if significant amounts of customer time in line may be reduced and revenue from product sales could be increased.

Currently, new standards for barcode specification (e.g., global trade identifier number (GTIN)) and product description information provide retailers with a large amount of electronic information about the products and barcodes within their premises. The barcode verification system capitalizes on new imager scanners that can capture images of the products and barcodes to efficiently identify products that should be flagged for special handling.

In most embodiments, the automated verification system includes scanners that optically read barcodes on products. In some instances, the scanner may be configured to read tattered barcodes or out-of-specification barcodes. The scanners, in some embodiments, generate images of the products having the barcodes. The images are processed to extract detailed information about the product and the barcodes affixed to the product. The extracted product and barcode attributes may be stored and sorted to quickly identify, among other things, poor-quality barcodes printed on packaging for the products.

With this automated verification system, retailers or suppliers may obtain a list of possible products (e.g., barcodes) that are not compliant or are difficult to read. In turn, the retailers may increase their throughput and productivity by reducing the out-of-specification barcodes printed on products.

In at least one embodiment, the verification system is implemented in the scanner. The scanner may be equipped with a virtual machine that executes the algorithms and processes to grade barcodes extracted from images captured by the scanners. This virtualization allows the scanner to efficiently utilize processing and memory cycles. The virtualized verification system may extract data to provide a readability grade for barcodes scanned by the scanner. This data may be transmitted to the point of sale (POS) terminal where it is sorted for action by the product management department to improve bar code quality at the front end.

In other embodiments, the scanner and verification server are separate devices. The barcode verification system may include a scanner, verification server, point of sale terminal, product database, and barcode database. The scanner is communicatively connected to the verification server and the POS terminal using different interfaces: the communication interface dedicated to the verification server may be a high-speed connection. The verification server is communicatively connected to the barcode database. And the product database is communicatively connected to the POS terminal.

Figure 1:
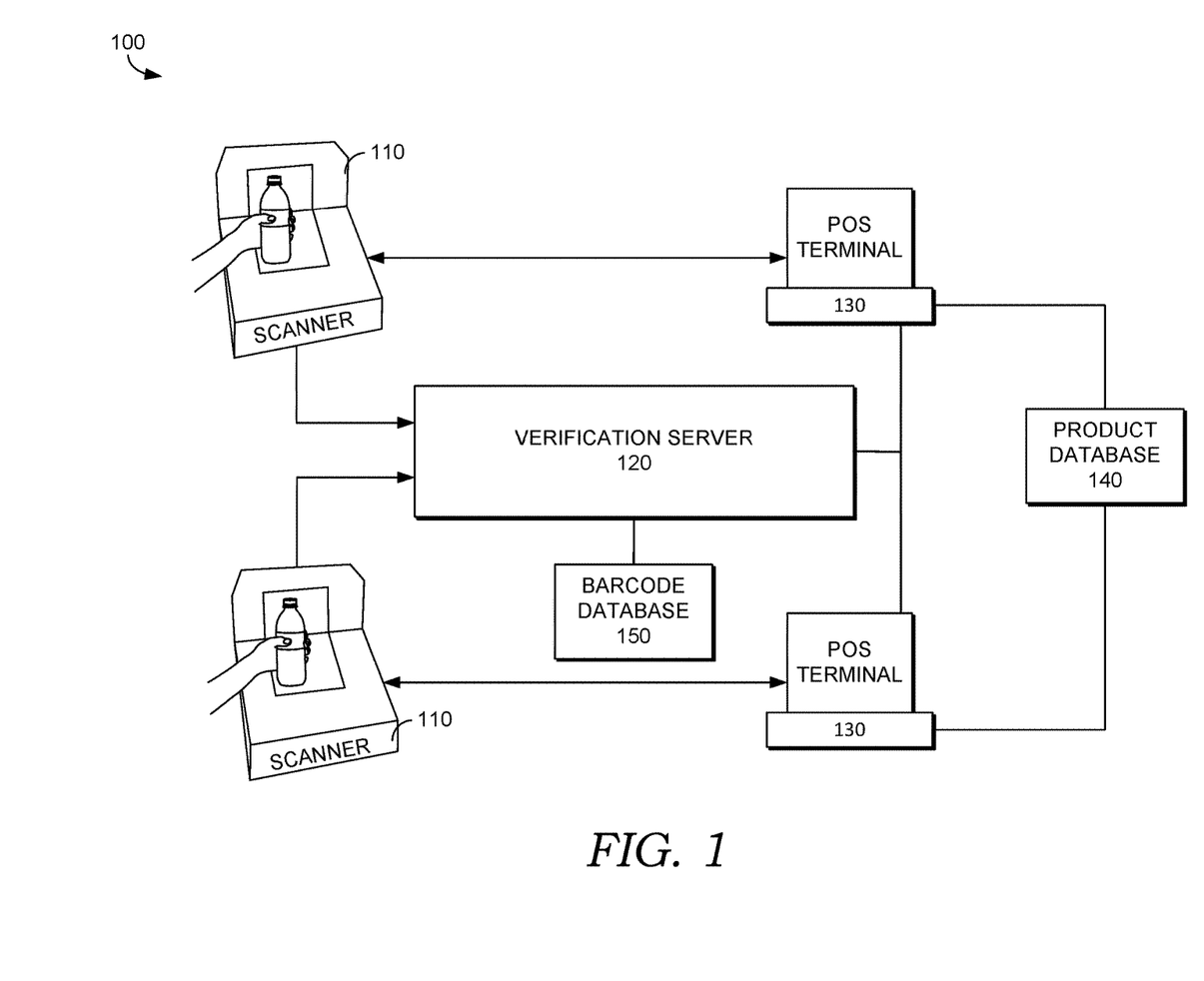
FIG. 1 illustrates an exemplary barcode verification system in accordance with embodiments of the invention.

FIG. 1 illustrates an exemplary barcode verification system 100 in accordance with embodiments of the invention. The barcode verification system 100 includes a scanner 110, a verification server 120, a POS terminal 130, a product database 140, and a barcode database 150.

The scanner 110 scans products or devices. In one embodiment, the scanner 110 may be an omnidirectional scanner. The omnidirectional scanner is configured to read product and barcode information at several different angles. The scanner 110 optimizes light levels to automatically capture images and read codes from products or screens like mobile phones, personal digital assistants (PDAs), or computer display screens. With these optimizations, the scanner is motion tolerant and able to read products and barcode as they move along a path. The scanner 110 may produce an indicator that visualizes a successful read. In turn, the scanner 110 captures a digital image of the product and returns extracted barcode information. The barcode may include 1D or 2D barcodes. The scanner 110 transmits barcode and image attributes to the verification server 120 for additional processing.

The verification server 120 obtains image and barcode attributes from the scanner 110, in some embodiments. The verification server 120 stores, among other things, barcode attributes in the barcode database 150 and generates notifications based on the stored barcode information. The verification server 120 is configured with a processor and memories. The memories store computer-useable instructions for generating the notifications based on the barcode attributes received from the scanner 110.

In other embodiments, the processor of the verification server 120 obtains images of the products to which barcodes are adhered. The processor extracts the barcodes whether they are complete or partial barcodes from the images and assigns a grade to each extracted barcode. Alternatively, the processor may assign the grade to each extracted barcode provided by scanner 110. The notifications that are generated by the verification server 120 are consistent with the assigned grade. The notifications can be transmitted to a POS terminal 130. For instance, the notifications may indicate that the barcodes are in-specification, printed properly, and aligned to maximize throughput for passing grades A-C. On the other hand, the notifications may identify errors (e.g., misalignment, printing quality, out-of-specification, etc.) for grades D-F.

Additionally, all notifications may be transmitted to a store manager via a text message, e-mail, or some other electronic communication. In certain embodiments, designated notifications are transmitted to a store manager only if the grade assigned to the barcode of the product is below a specified threshold. The designated notifications may indicate whether the barcode of the product is inconsistent with barcode standards. The designated notification also may indicate whether the barcode of the product is misplaced or whether the barcode of the product is printed with low readability.

The POS terminal 130 completes the purchase of the product that was scanned by the scanner 110. The POS terminal 130 generates a sale price for the item and transaction receipt. The sale prices are linked to the product's barcode when adding product stock to the inventory. Accordingly, the POS terminal, or cashier if present, locates this price by performing a look-up based on the product's barcode. The POS terminal 130 obtains the extracted barcode attributes from the scanner 110. The POS terminal 130 queries the product database 140 using the extracted barcode to obtain a product name and price. At this point, customers provide payment credentials and authorization, or cash or vouchers, in exchange for the scanned products. In turn, the retailer prepares receipts (which may be a register printout or an electronic receipt that is provided by short message service or email) for the customers.

In some embodiments, the verification server 120 and barcode database 150 can be virtualized in the POS terminal 130 using a separate communication interface. The POS terminal 130 may be configured with both hardware and software that are configured to enable virtualization and sharing of the processor and memory. This may minimize the cost of having another processor, memory, etc., of the verification server 120.

The product database 140 may be part of the inventory management system for the retailer. The product database 140 receives a query identifying a barcode or list of barcodes. In turn, the product database 140 returns product attributes for the products matching the barcode information. The product database 140 may include several thousand records. Each product is uniquely identified by the GTIN attributes. The records in the product database 140 may include, among other things, product name, product price, product barcode, and product stock level. The results returned in response to the query may include product name and product attributes corresponding to the matching barcode information.

The verification server 120 transmits the images, extracted barcodes, and grades to the barcode database 150 for storage. The barcode database 150 stores the images and other product information associated with products scanned by the scanner 110. In some embodiments, the barcode database 150 retains the images and product information only for products having a barcode that is assigned a grade below a specified threshold. The barcode database 150 may store statistics for each barcode. The records for an extracted barcode may include the images, time to decode on a specific frame (usually available from the scanner 110), numbers of frames which include at least part of a barcode needed to decode the symbol, numbers of segments needed to decode and orient the symbols (e.g., stitching feature or label assembly), and type of problems encountered during the decoding phase: quiet zone, missing bar, correction of bar used by the algorithm to get it decoded, symbol contrast, reflectance, minimum edge contrast, modulation (wide or narrow elements in the symbol), and/or any defect detected (e.g., partially obscured).

Accordingly, based on the number of barcodes for the same product included in the barcode database, the verification server provides a notification that the barcode associated with the product is problematic. In some instances, the notification may include an indication of whether the problem is an internal problem (e.g., printing issue for fresh produce) or external problem (e.g., vendor-provided labels are out-of-specification or misprinted).

In other embodiments of the invention, the verification server is a component of the scanner. The scanner may virtualize the verification server and generate the notifications as needed based on the decoded images. The scanner may include imagers, decoders, and processors (e.g., field programmable arrays (FPGA)) for the extracted barcodes. Alternatively, the verification server may include a barcode decoder. The scanner, in certain embodiments, sends only product images to the verification server without decoding the barcode. In turn, the verification server decodes the barcode and transmits the decoded barcode data to a POS terminal.

Figure 2:
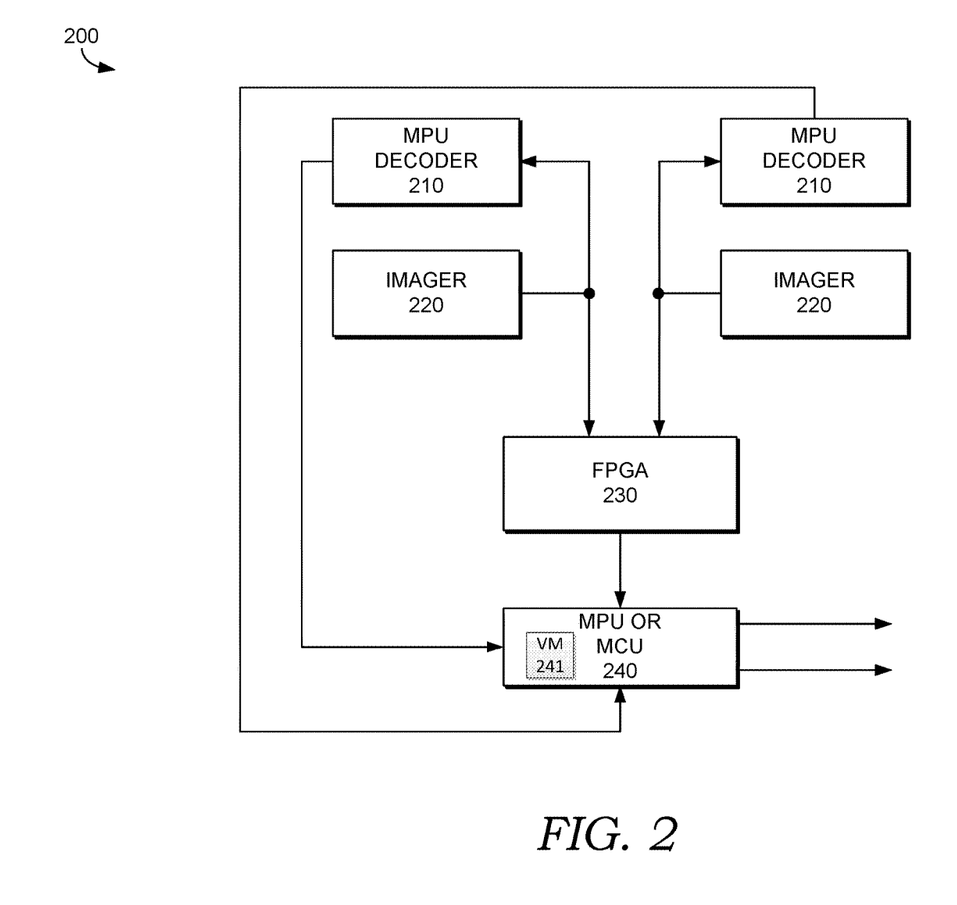
FIG. 2 illustrates an exemplary scanner in accordance with embodiments of the invention.

FIG. 2 illustrates an exemplary scanner 200 in accordance with embodiments of the invention. The scanner 200 includes microprocessor units (MPU) decoders 210, imagers 220, field programmable arrays (FPGA) 230, and a microcontroller unit (MCU) 240.

The MPU decoders 210 extract and decode barcodes included in images provided by the imagers 220. The MPU decoders 210 identify the size of the barcode, and/or the patterns of the code, and then convert the patterns into human-readable text. In some embodiment, the MPU decoders 210 convert the barcodes extracted from the images of the products in accordance with current industry standards. Alternatively, the images captured by the imagers 220 are transmitted to the verification server for decoding by way of the FPGA 230 and MCU 240. The decoded barcode attributes are transmitted to the MCU 240 for transmission to the POS terminal or the barcode database, as needed. In some embodiments, the MPU decoders 210 provide barcode attributes that include, among other attributes, human-readable text, quiet zone, missing bar, correction of bar used by the decode algorithm to get the bar decoded, symbol contrast, reflectance, minimum edge contrast, or modulation (e.g., wide or narrow elements in the symbol, any defect detected, and/or a barcode that may be partially obscured).

The imagers 220 generate images from the products that are scanned within the scan window of the scanner 200. The generated images may include high-resolution images. In one embodiment, when the scanner is an omnidirectional scanner, it may generate multiple images of the product from different angles. In some embodiments, the imagers 220 stitch several images together to create an image having the barcode. The imagers 220 are connected to the MPU decoders 210 and the FPGA 230. The images captured by the imagers 220 are transmitted to the MPU decoders 210 and FPGA 230.

The FPGA 230 may provide additional image processing to the images generated by the imagers 220. For instance, FPGA 230 may be configured to track a product across multiple images from different angles. The FPGA 230 may run additional image processing functions, rotating, brightening, darkening, image compression to reduce image transmission loads, etc. In turn, the FPGA 230 may orient and combine multiple images to identify the barcode for the product. The FPGA-processed images are then provided to MCU 240 for transmission to a barcode database.

The MCU 240 transmits decoded barcode information to a POS terminal and, when necessary, transmits both the decoded barcode information and images to a barcode database. The MCU 240 receives the decoded barcode information from the MPU decoders 210. Additionally, the MCU 240 provides the decoded barcode information and the images to the barcode database for processing. In some embodiments, the MCU 240 implements a virtualized verification server in a virtual machine (VM) 241. The virtualized verification server determines whether the decoded barcode information and images will be transmitted for storage to the barcode database.

The virtualized verification server operates like the verification server of FIG. 1 above. In summary, the virtualized verification server assigns a grade to the decoded barcode and decides which images should be sent to the barcode database for image load minimization. Based on the assigned grade, both the decoded barcode and the images of the barcode are stored in the barcode database. In some embodiments, the virtualized verification server may generate and transmit the notifications to the POS terminal or the store manager as explained above.

In some embodiments, the verification server executes a computer-implemented method to verify the barcodes. When executed, the method causes the verification server to, among other things, extract barcodes from images, assign grades to each extracted barcode, and generate notifications. The notifications, in turn, are transmitted to the POS terminal or the store manager. At the POS terminal, the notification may include a visual notification. For instance, an amber color may indicate that the barcode was successfully scanned, but that it may be out-of-specification or misprinted.

Figure 3:
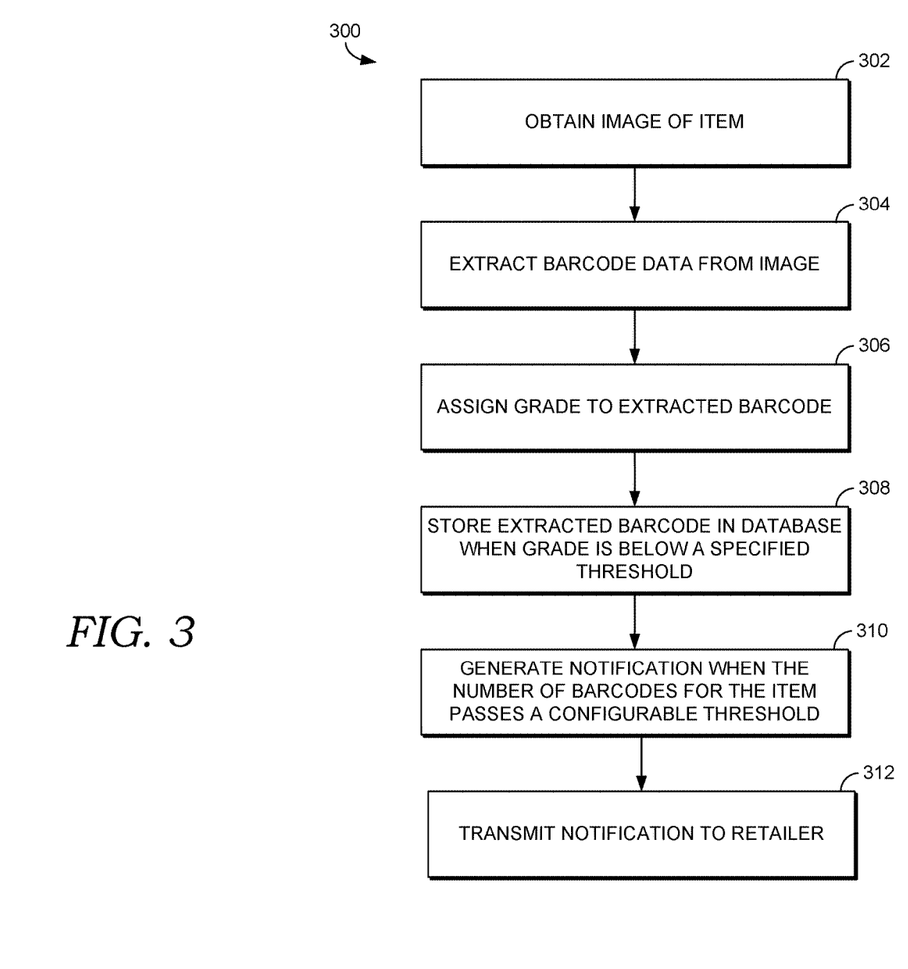
FIG. 3 illustrates an exemplary logic diagram for generating notifications in accordance with embodiments of the invention.

FIG. 3 illustrates an exemplary logic diagram 300 for generating notifications in accordance with embodiments of the invention. Upon initializing the verification server, images of products having barcodes are obtained in step 302. In step 304, the verification server extracts the barcodes from the images. Based on the extracted barcodes, a grade is assigned, in step 306. In step 308, the extracted barcode is stored in a barcode database if it receives a grade below a specified threshold. The barcode database stores the images, the extracted barcode, and the grades assigned to the barcodes. In one embodiment, a scanner is communicatively connected to the barcode database and transmits the images to the barcode database when the product is scanned. In some embodiments, before the image is transmitted to the database, the scanned image is checked to verify that it satisfies certain conditions like (a) complete label is decoded from the image or (b) partial label is decoded from the image.

The extracted barcode, in certain embodiments, is stored when the assigned grade for the extracted barcode is below a specified threshold. The extracted barcode, assigned grade, and images are stored in the barcode database. A notification is generated, in step 310, consistent with the assigned grade. In step 312, the generated notifications are transmitted, in some embodiments, to the retailer. The notifications may be transmitted when the grade assigned to the barcode of the product is below a specified threshold. Additionally, the notifications may be transmitted to a POS terminal. In other embodiments, the notifications may be transmitted via a text message, e-mail, or other designated electronic communication.

The barcode verification server includes several components. The components may be implemented in a combination of hardware, software, or firmware. The components include a barcode extractor component, grade assignment component, compliance check component, and barcode notification component. The barcode notification component receives outputs from the barcode extractor component, grade assignment component, compliance check component, and barcode notification component. These outputs may be relayed via a notification to the retail manager.

Figure 4:
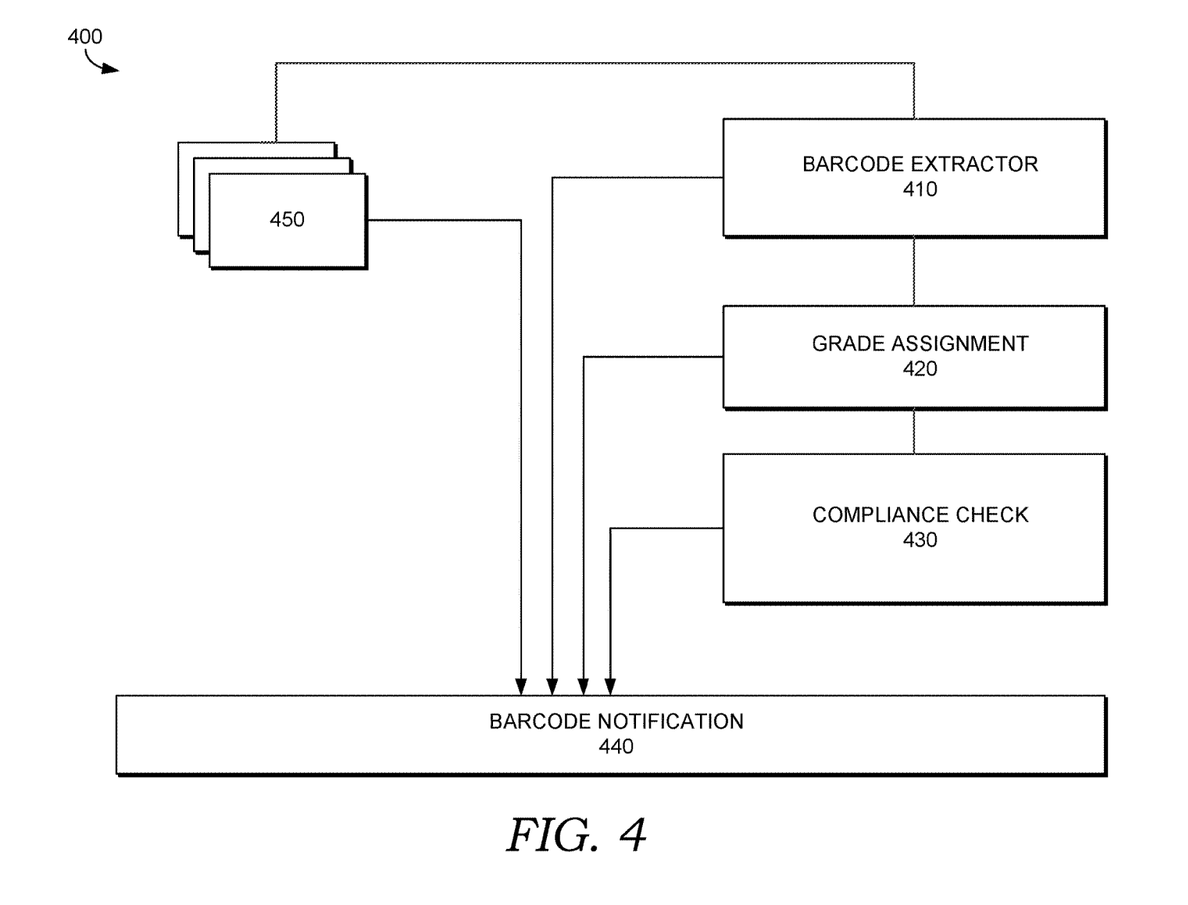
FIG. 4 illustrates an exemplary component diagram for barcode verification of images generated by the scanner in accordance with embodiments of the invention.

FIG. 4 illustrates an exemplary component diagram 400 for barcode verification of images generated by the scanner in accordance with embodiments of the invention. In most instances, the barcode attribute information related to the decoding phase of the scanner is transmitted to the verification server. The barcode attribute information for tattered barcodes or out-of-specification barcodes may not include any attribute information because the scanner was unable to decode the barcodes. In these instances, the scanner sends any extracted barcode information and raw images to the verification server for further analysis.

The components of the verification server may include any combination of the following components: a barcode extractor component 410, a grade assignment component 420, a compliance check component 430, and a barcode notification component 440.

The barcode extractor component 410 may include a decoder that extracts additional barcode attributes from the images 450 of items scanned by the scanner. The barcode extractor component 410, in some embodiments, includes additional processing algorithms that may be executed on the tattered or out-of-specification barcodes. The barcode extractor component 410 extracts and decodes barcodes included in the images received from the scanner. The barcode extractor component 410 identifies the size and patterns of the barcode, and then converts the patterns into human-readable text.

In some embodiments, the barcode extractor component 410 may use the decoded data from the scanner as a start point to significantly reduce processing time. The decoded data from the scanner may include label data and location data. In certain embodiments, the barcode extractor component 410 converts the barcode in accordance with current industry standards for the barcodes extracted from the images of the products. The decoded barcode attributes are transmitted to the grade assignment component 420 for grading.

For instance, the barcode extractor component 410 provides barcode attributes that may include, among other attributes, human-readable text, quiet zone, missing bar, correction of bar used by the algorithm to get it decoded, symbol contrast, reflectance, minimum edge contrast, modulation (wide/narrow elements in the symbol), and/or any defect detected (e.g. partially obscured barcode).

The grade assignment component 420 obtains the barcode attribute information and assigns a grade to the barcode based on the combination of the extracted attributes provided by the barcode extractor component 410. In some embodiments, the grade assignment component 420 selects a grade that ranges from A through F. An "A" is associated with a barcode that is successfully decoded and that is consistent with a barcode specification. On the other hand, if the barcode extractor component 410 is unable to extract any attributes, the grade assignment component 420 may assign an "F" grade to the barcode. The barcode attribute data may be classified as follows: Grade A-B (Good), Grade C (OK), or Grade D-F (failure or very bad).

In some embodiments, the overall grade is assigned by the grade assignment component 420 based on individual grades assigned for each of the following attributes: edge determination, reflectance, symbol contrast, edge contrast, modulation, defects, decode, decodability, quiet zone, unused error correction, fixed pattern damage, grid uniformity, and axial non-uniformity.

The edge determination is the image of the barcode as it is perceived by a moving aperture, such as a laser beam or a barcode wand. The grade assignment component 420 assigns a grade to images of barcode edges.

The minimum reflectance checks that the darkness of the bars is sufficient. To meet linear barcode quality requirements, in one embodiment, the amount of light reflected by the bars (bar reflectance) must be less than half the light reflected by the spaces (space reflectance). The grade assignment component 420 assigns minimum reflectance an appropriate grade.

The symbol contrast measures the contrast between the brightest space and the darkest bar. The result is assigned a letter grade of A, B, C, D or F, with A being the highest contrast. The grade assignment component 420 assigns symbol contrast an appropriate grade.

The edge contrast is an important 1D barcode standard. This attribute assesses the minimum edge contrast, ensuring the contrast between adjacent bars and spaces is high enough. The grade assignment component 420 assigns edge contrast an appropriate grade.

The grade assignment component 420 verifies modulation and checks for the worst case dip in contrast any place in the barcode. If all bars and spaces are the same brightness, modulation would be equivalent to symbol contrast, or 100 percent. If some spaces are less bright than the brightest one, modulation will be some fraction of the overall contrast. This percentage is assigned a letter grade by the grade assignment component 420. A lower percentage receives a better grade. Excessive ink spread can result in low modulation because very narrow spaces appear to be filled in by the encroaching bars in the scan reflectance profile.

The defects is the worst case change in darkness within a single bar or space. The linear barcode standard for the largest difference in reflectivity found in a single bar or space is measured as a percentage of the symbol contrast and assigned a letter grade. The grade assignment component 420 assigns defects an appropriate grade in accordance with international standards (e.g., barcode label specifications for GS1, ISO, or International Electrotechnical Commission (IEC) standards may be used to grade assignment).

The decode attributes provide the measured widths of each bar and space to interpret the number content of the barcode according to a specific mathematical formula appropriate for the barcode type. If the barcode cannot be decoded according to the formula, the accuracy of the bar and space widths are inadequate. The grade assignment component 420 assigns decode an appropriate grade.

The decodability of the 1D barcode quality formula used for decoding is further analyzed to assess accuracy of the width between the bar and space. A perfectly accurate barcode will have 100 percent decodability, but decodability as low as 25 percent is often acceptable. This measure tracks degradation in printing plates and gives early warnings while there is still plenty of room for more degradation. The grade assignment component 420 assigns decodability an appropriate grade.

The quiet zone checks for adequate space on the left and right of the barcode. Often a design oversight violates the requirements for adequate space, but generally this is not something that would fluctuate during a print run. The grade assignment component 420 assigns quiet zone an appropriate grade.

The unused error correction tests the extent to which regional or spot damage in the symbol has eroded the reading safety margin that the error correction provides. The grade assignment component 420 assigns unused error correction an appropriate grade.

The fixed pattern damage measures the damage in the finder pattern, quiet zone, clock pattern, and solid area segment regions. Pattern damage can be caused by an improper printer nozzle, a faulty thermal element, or physical damage to the barcode. The grade assignment component 420 assigns fixed pattern damage an appropriate grade.

The grid uniformity measures the largest deviation of the grid centers from their ideal theoretical position, as determined by the reference decode algorithm. The measurements are expressed as a fraction of the width of the symbol under test. The grade assignment component 420 assigns grid uniformity an appropriate grade.

Axial non-uniformity is a measure of how much the sampling point spacing differs from one axis to another. The grade assignment component 420 assigns axial non-uniformity an appropriate grade.

Time to decode is the length of time a barcode was processed. The acceptable range for decoding times is configurable and ranges. For instance, from less than two hundred microseconds (assigned an A). Between two hundred and four hundred microseconds (assigned a B). Between four hundred and nine hundred microseconds (assigned a C). Between 900 through 1000 microseconds may be assigned an D. If the length of time is longer than one second, the time to decode is assigned an F. The grade assignment component 420 assigns time to decode an appropriate grade.

Based on the individual grades assigned to the above barcode attributes, an overall grade of the barcode is provided. A barcode grade of F may be assigned under the following conditions: 50 percent of decoded attributes assigned a grade of F; barcode decoded but not compliant (this may cause incorrect interpretation); partial barcode only; partial barcode with optical character recognition of characters recognized below barcode; partial elements of barcode seen and different from prior decoded barcodes of item. In some embodiments, one or more attributes may be weighed more than other attributes by the grade assignment component 420 when assigning grades. The attribute grades and the barcode grade are sent to the barcode notification component 440.

The compliance check component 430 confirms whether the extracted barcode is compliant with current industry standards. The extracted barcodes should be consistent with a recognized industry standard, such as GS1 standard, International Standards Organization (ISO) 154165, or ISO 15416. The compliance check component 430 identifies the standard applied to the extracted barcode and provides an indication of whether the barcode is consistent. In turn, the compliance check component 430 transmits to the barcode notification component 440 an indication of whether the barcode is consistent with the applicable standards and the identity for the applied standard for all barcodes.

The barcode notification component 440 receives the output from the barcode extractor component 410, the grade assignment component 420, and the compliance check component 430. The barcode notification component 440 also receives the images 450 of the scanned product. In turn, the barcode notification component 440 determines whether to generate a notification. In some embodiments, the notifications are generated for barcodes that are out-of-specification or that have received a grade of D or F. In other embodiments, the barcode notification component 440 generates a notification that includes the assigned grade, the image, and the barcode attribute information.

The notifications may be transmitted to a retail manager by email, short message service, or some other electronic communication. In certain embodiments, the barcode notification component 440 may transmit the information to the POS terminal. The barcode notification component 440 also may transmit the collected information to a database for storage. The stored images, barcode attributes, time to decode barcode, number of images needed to extract barcode, compliance with standards, device identifier for scanner that scanned the item and produced images, grades, and the extracted barcode may be sorted and displayed to the store manager. In one embodiment, the database may include an identification of whether the grades where assigned by a built-in component of the scanner (e.g., virtualized verification server) or by a separate verification server.

In certain embodiments, the barcode notification component 440 may only send certain barcodes for storage in the database. In some instances, a threshold can be set to minimize the size of the database. The barcode and image information will be recorded only for barcodes that receive a grade of less than C or more than a threshold number of failures (e.g., 10). Once the database is populated with the barcode information, queries may be issued against the fields of the database. Exemplary queries may locate records with "Grade=F" & "quiet zone" not compliant;

"Grade==D" and "Number of failures before barcode decoded>2;" or "Grade==D" and "Number of segments needed to decode & identify orientation>2."

Accordingly, the verification server collects the image, analyzes the image, and decodes the barcode to provide barcode attributes, which can contribute to a barcode grade, as explained above. All the barcode attributes will be stored in the barcode database and may be retrieved for further analysis (e.g., the data may be used for cashier or checker training: bi-optic scanners will indicate whether the scanner view used by the cashier was vertical or horizontal). Thus, when a scanner fails to decode a barcode, but recognizes part of that barcode, the scanned images may be transmitted to the verification server to store, decode, and grade the barcode. In certain embodiments, the scanner devices may have combined decoder and verifier functions. The external verification server, however, may be more powerful than the scanner and may be configured to confirm the grades assigned to the barcodes by the scanners.

Figure 5:
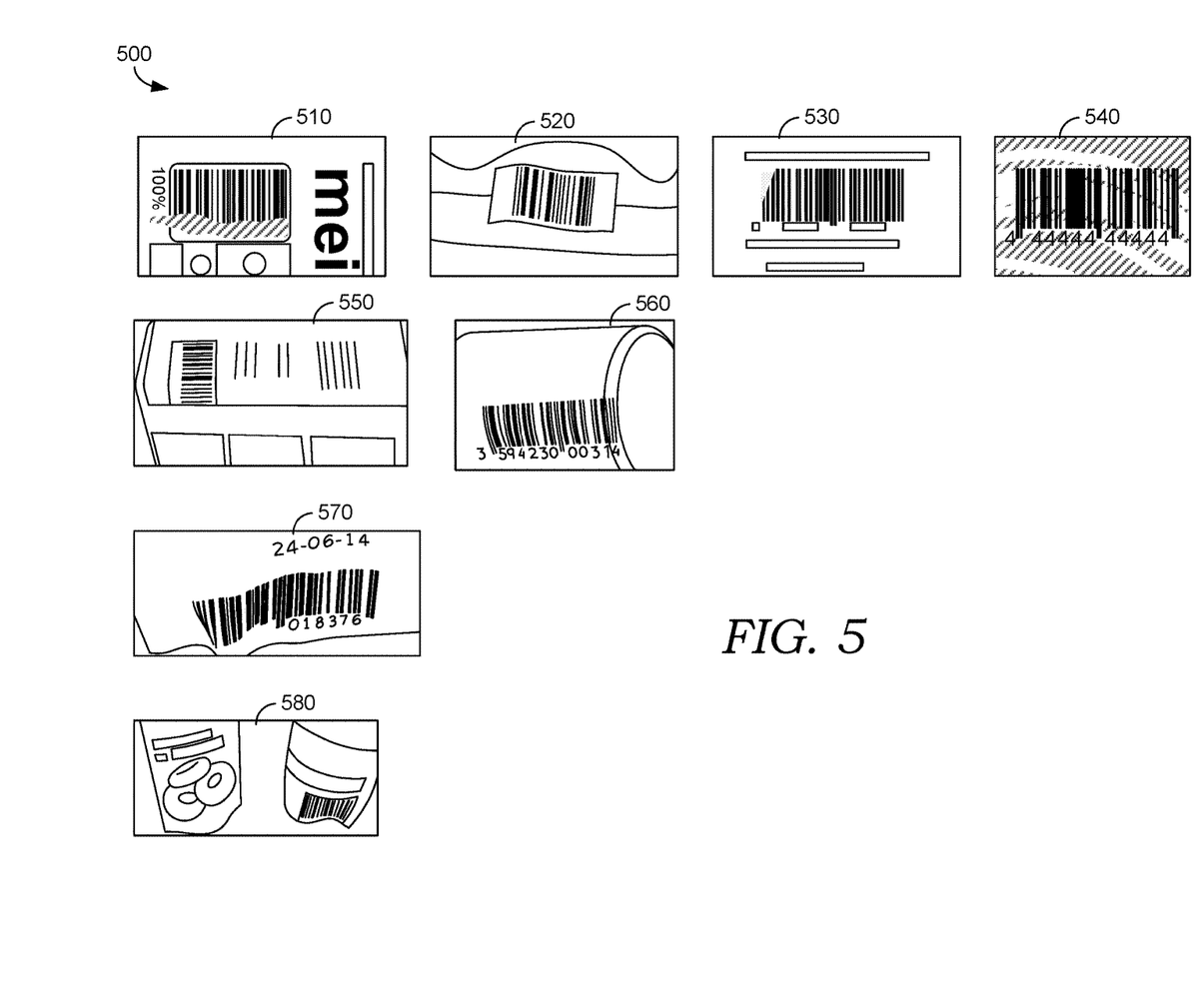
FIG. 5 illustrates exemplary problematic barcodes identified by the barcode verification system in accordance with embodiments of the invention.
Figure 6:
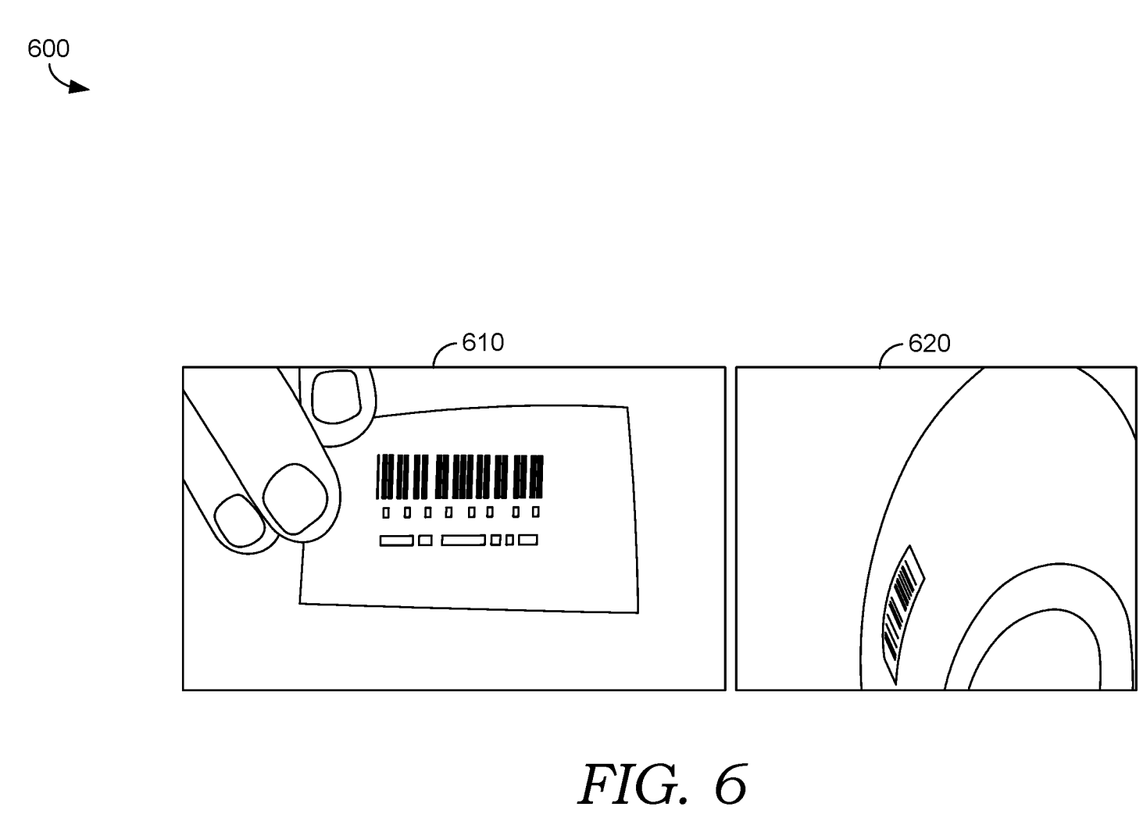
FIG. 6 illustrates exemplary scanned images generated by the barcode verification system in accordance with embodiments of the invention.
Figure 7:
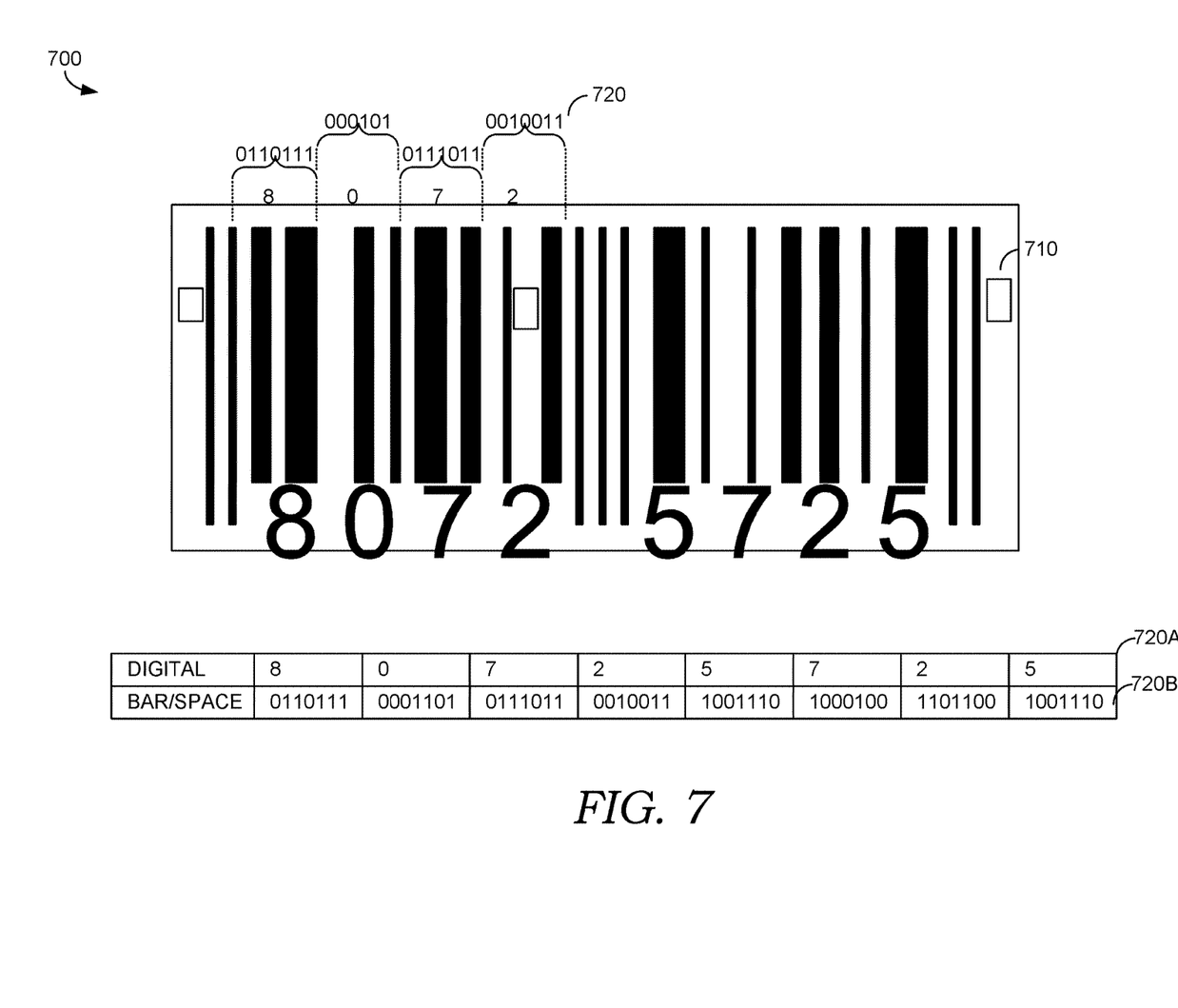
FIG. 7 illustrates an exemplary out-of-specification barcode checked for compliance against international standards in accordance with embodiments of the invention.

FIGS. 5-7 show exemplary barcodes that are identified for verification and further processing. FIG. 5 illustrates exemplary problematic barcodes 500 identified by the barcode verification system in accordance with embodiments of the invention. FIG. 6 illustrates exemplary scanned images 600 generated by the barcode verification system in accordance with embodiments of the invention. FIG. 7 illustrates an exemplary out-of-specification barcode 700 checked for compliance with international standards in accordance with embodiments of the invention.

Turning now to FIG. 5, barcodes 510, 520, 530, 540, 550, 560, 570, and 580 were identified as having scanning issues and grades (D or F) that caused the verification server to save the barcodes in the barcode database. The verification server identified and confirmed that barcodes 510, 520, 530, and 540 were out of specification with applicable industry standards. The verification server identified barcodes 550 and 560 as difficult to read because they are on two faces of their respective products and require stitching or additional image processing. The verification server identified barcode 570 as difficult to read because the label is not properly affixed to the product. The barcode 570 required additional image processing to identify the product. The verification server identified barcode 580 as difficult to read because the surface of the product was curved. Similar to barcodes 550, 560, and 570, the verification server performed additional image processing on the barcode 580 to identify the product.

Turning now to FIG. 6, the verification server may perform additional image processing on the actual images 610 and 620 of the product. The images of the barcodes on the products may be used to identify the barcode when the scanner is unable to read a barcode based on the placement of the product on the scanner. The image 610 may be an in-house printed barcode. The image 610 shows a front view of the printed barcode. Image 620 shows the barcode affixed to the product in a difficult-to-read position when being processed by the scanner. In this view from a multiplane scanner, the image 620 is split across several images. In some embodiments, the verification sever may provide a notification that includes suggested changes to the location of the in-house printed label when it is affixed to the product.

Turning now to FIG. 7, the verification server may identify the quiet zone defects 710 in a barcode. Because of the defect in the printed barcode, most scanners will not decode it. In turn, the verification server may identify the defect in the barcode as a quiet zone defect. The current specification of quiet zone requires this zone to be seven times the dimension of the narrowest element in the barcode. In quiet zone defect 710, the quiet zone is less than 3 modules (left or right side) so the decoding fails. In limited instances, the scanners with additional image processing may decode the barcode with some difficulties even when the quiet zone is not compliant. In one embodiment, if a barcode required additional image processing to decode because of out-of-specification quiet zones, the barcode may be stored in the barcode database for reporting to the retailer. Upon a successful decode by the verification server or scanner, each symbol of the barcode may be represented as a binary number 720. This barcode may be stored in the barcode database. Accordingly, non-compliant 'quiet zone' barcodes may be easily retrieved from the barcode database along with the image, GTIN, value of quiet zone, etc. In turn, reports may be generated to request correction from the supplier or improvements to the scanner.

In some embodiments, a data structure may be generated to store some of the decoded attributes of the barcode. For instance, the data structure may include digit field 720A and bar field 720B. The digit field 720A may store the digits for the identifier represented by the barcode. These digits include: 8, 0, 7, 2, 5, 7, 2, and 5. The bar field 720B stores the binary representation of the information stored by the barcode. The binary representation may correspond to a bar associated with a digit. The digit 8 may be represented by a bar having binary code: 0110111. The digit 0 may be represented by a bar having binary code: 0001101. The digit 7 may be represented by a bar having binary code: 0111011. The digit 2 may be represented by a bar having binary code: 0010011. The digit 5 may be represented by a bar having binary code: 1001110. The digit 7 may be represented by a bar having binary code: 1000100. The digit 2 may be represented by a bar having binary code: 1101100. The digit 5 may be represented by a bar having binary code: 1001110.

Accordingly, the verification server generates a database of problematic barcodes and images. The barcode database stores several decoded attributes. These attributes include, among other attributes, quiet zone attributes, correction of bar or space necessary to read attributes, symbol contrast attributes, reflectance attributes, modulation attributes, minimum edge contrast attributes, width of a single module attributes, and other attributes specified by GS1 or a corresponding barcode standard that defines a grade for the identified attribute.

The barcode database generated by the verification server also may be configured to store additional barcode attributes, if needed. The additional barcode attributes include the global trade identifier, timestamp having the time and date in an attempt to decode the barcode that was made, and the length of time it took to decode the barcode. In some embodiments, additional barcode attributes consist of the number of image segments needed to decode and identify the orientation of the barcode, the number of failures before the barcode was successfully decoded, and the images saved and used to decode the barcode.

In turn, a designated individual may sort the records in the database using the attributes stored in the database. With this additional functionality and access to a searchable database, a retailer is alerted about barcode compliance, printing quality of barcode, and the specific lot or items that are problematic. Additionally, the database allows the retailers to promptly find problems with internal printers that generate barcodes for produce, baked goods, sandwiches, and other fresh items and alert in real-time. In certain embodiments, the verification server may be linked to one or several barcode readers and may be configured to send alerts through electronic communications (e.g., email, phone message, etc.) to the retailers.

In summary, any imager scanner (e.g., 360° automated scanner with multiple cameras that generate images) may be configured to perform automatic barcode verification functions. The imager scanners may be configured with a virtual verification server to monitor barcode compliance and readability. If the scanner device is not powerful enough to execute successful reading performance, an external verification server may be deployed. The external verification server may independently analyze the barcode images sent by the scanner to confirm and identify related attributes (e.g. barcode value, image used to decode, basic elements related to the decoding phase including time to decode, number of segments needed to finalize the decoding, etc.). The verification server generates and maintains a barcode database to provide notifications on the identified products that may have readability problems.

The foregoing descriptions of the embodiments of the invention are illustrative, and modifications in configuration and implementation will occur to persons skilled in the art. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The technology claimed is:

1. A verification server for barcodes, the verification server having a processor and memories that store computer useable instructions for generating notifications based on barcodes attached to products, the server comprising:
   a processor that obtains images of one or more products having barcodes attached thereto, extracts at least one barcode from each image, assigns a grade to each extracted barcode, and generates a notification based on at least one assigned grade; and
   a database that stores the images, the extracted barcodes, and the grades assigned to the barcodes, wherein the grade assigned to each extracted barcode is based, at least in part, on one or more of edge determination, symbol contrast, edge contrast, modulation, defects, decode, decodability, quiet zone, unused error correction, fixed pattern damage, grid uniformity, and axial non-uniformity.

2. The verification server of claim 1, wherein a scanner is communicatively connected to the verification server, the scanner transmitting the images to the processor when the one or more products are scanned.

3. The verification server of claim 2, wherein the verification server is a component of the scanner.

4. The verification server of claim 1, wherein the notifications can be transmitted to a point of sale terminal.

5. The verification server of claim 1, wherein the notifications are transmitted to a store manager via a text message, e-mail, or other electronic communication.

6. The verification server of claim 1, wherein the notifications are transmitted to a store manager when the grade assigned to an extracted barcode is below a first specified threshold or when a threshold number of a particular barcode is assigned a grade below a second specified threshold.

7. The verification server of claim 1, wherein the notification indicates whether a particular barcode is inconsistent with barcode standards.

8. The verification server of claim 1, wherein the notification indicates whether a particular barcode is misplaced or whether the particular barcode is printed with low readability.

9. A computer-implemented method for generating notifications based on barcodes attached to products, the method comprising:
   obtaining images of one or more products having barcodes attached thereto;
   extracting at least one barcode from each image;
   assigning a grade to each extracted barcode, the grade assigned to each extracted barcode being based, at least in part, on one or more of edge determination, symbol contrast, edge contrast, modulation, defects, decode, decodability, quiet zone, unused error correction, fixed pattern damage, grid uniformity, and axial non-uniformity; and
   generating a notification based on at least one assigned grade.

10. The computer-implemented method of claim 9, wherein a database stores the images, the extracted barcodes, and the grades assigned to the barcodes.

11. The computer-implemented method of claim 10, wherein a scanner is communicatively connected to the database and transmits the images to the database when the one or more products are scanned.

12. The computer-implemented method of claim 9, wherein the notifications are transmitted to a point of sale terminal.

13. The computer-implemented method of claim 9, wherein the notifications are transmitted via a text message, e-mail, or other electronic communication.

14. The computer-implemented method of claim 9, wherein the notifications are transmitted when the grade assigned to an extracted barcode is below a first specified threshold or when a threshold number of a particular barcode is assigned a grade below a second specified threshold.

15. A scanner for barcodes, the scanner having a processor and memories that store computer-useable instructions for generating notifications based on barcodes attached to products, the scanner comprising:
   a processor that obtains images of one or more products having barcodes attached thereto, extracts at least one barcode from each image, assigns a grade to each extracted barcode, and generates a notification based on at least one assigned grade; and
   a database that stores the images, the extracted barcodes, and the grades assigned to the barcodes, wherein the grade assigned to each extracted barcode is based, at least in part, on one or more of edge determination, symbol contrast, edge contrast, modulation, defects, decode, decodability, quiet zone, unused error correction, fixed pattern damage, grid uniformity, and axial non-uniformity.

16. The scanner of claim 15, wherein the notification indicates whether a particular barcode is inconsistent with barcode standards.

17. The scanner of claim 15, wherein the notification indicates whether a particular barcode is misplaced or whether the particular barcode is printed with low readability.

18. The scanner of claim 15, further comprising an imager that captures the images of the one or more products.

19. The scanner of claim 18, further comprising a decoder that extracts the barcodes from the images of the one or more products.

20. The scanner of claim 18, further comprising a connection to a point of sale terminal, wherein data is transmitted over the connection and the data is selected from one or more for the following: the extracted barcodes or the generated notifications.

\* \* \* \* \*